(12) United States Patent
Provost

(10) Patent No.: US 8,790,564 B2
(45) Date of Patent: Jul. 29, 2014

(54) FABRICATION METHOD OF COMPOSITE COMPONENTS AND THUS OBTAINED COMPONENTS

(75) Inventor: Benjamin Provost, Toulousse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 221 days.

(21) Appl. No.: 13/182,123

(22) Filed: Jul. 13, 2011

(65) Prior Publication Data

US 2012/0015213 A1     Jan. 19, 2012

(30) Foreign Application Priority Data

Jul. 15, 2010   (FR) ..................... 10 55749

(51) Int. Cl.
| B29C 70/00 | (2006.01) |
| B29C 70/44 | (2006.01) |
| B29C 70/88 | (2006.01) |
| B29K 707/04 | (2006.01) |

(52) U.S. Cl.
CPC ............... *B29C 70/882* (2013.01); *B29C 70/44* (2013.01); *B29K 2707/04* (2013.01); *B29K 2995/0005* (2013.01)
USPC .......................................... 264/258; 264/104

(58) Field of Classification Search
USPC ....................................................... 264/258
See application file for complete search history.

(56) References Cited

U.S. PATENT DOCUMENTS

| 4,081,600 A | * | 3/1978 | Kueneman et al. ........... 174/251 |
| 4,353,964 A | * | 10/1982 | Grimm et al. ................. 428/408 |
| 2005/0041362 A1 | | 2/2005 | Hall |

FOREIGN PATENT DOCUMENTS

| DE | 2657959 | | 6/1978 |
| DE | 10061894 A1 | * | 7/2001 |
| GB | 1447029 A | * | 8/1976 |
| GB | 1575428 | | 9/1980 |

OTHER PUBLICATIONS

English abstract of DE10061894.*
French Patent Office, International Search Report FR 1055749 (2 pgs.), Mar. 3, 2011.

* cited by examiner

*Primary Examiner* — Larry Thrower
*Assistant Examiner* — Xue Liu
(74) *Attorney, Agent, or Firm* — Wood, Herron & Evans, LLP

(57) ABSTRACT

During the cooking of a composite component including layers of fibers embedded into a matrix, a superficial pressure is exerted. This superficial pressure generates a deformation that causes local contacts of fibers of at least two layers without damaging these fibers. As a result, when an electrical current is applied on a side of the composite component, such as during a lightning strike or a short circuit, the added local contacts enable the electric current to flow along multiple fibers in the composite component, thereby avoiding significant spikes in temperature.

5 Claims, 3 Drawing Sheets

FABRICATION METHOD OF COMPOSITE COMPONENTS AND THUS OBTAINED COMPONENTS

CROSS-REFERENCE TO RELATED APPLICATIONS

This application claims priority to French Application No. 1055749, filed on Jul. 15, 2010.

TECHNICAL FIELD

The present invention relates to a method for manufacturing a composite component comprising superimposed layers of electrically conductive fibers embedded into an electrically insulating matrix.

Although not exclusively, the present invention more particularly applies to a component, for example a panel, made in CFRP (<<Carbon Fiber Reinforced Plastic>>).

BACKGROUND

Such a panel or such a part could more specifically be used in the aeronautics field, in particular for making an aircraft wall, for instance, of a transport airplane, and more specifically a part of the fuselage thereof.

It is known that, in the aeronautics field, a more and more significant part of usual metal components tend to be replaced with composite components, as a result of the advantages thereof, including more specifically:
a gain of mass; and
good mechanical properties.

Composite components also have other advantages, and in particular a lack of corrosion and a good fatigue behaviour.

As known, an aircraft is provided with a large number of electric cables, being, for example, fastened to the walls of the aircraft or arranged in the vicinity thereof. Thus, should a protective sheath be worn out or upon a breaking of such cable, a short-circuit may occur with a direct contact between the electric conductor of the cable and the composite panel or wall located in the vicinity.

The electric current being then injected into the composite material could result in a rise of temperature in the material. One of the worsening parameters related to the occurrence of such phenomena is linked to the distribution of the flow of electric current in the composite material. Indeed, the resin between the carbon fiber layers, forming the matrix of the composite material, electrically insulates those layers one from the others. A high local density of electric current is created at the contact level of the cable with the panel, which can cause a fast and significant increase of the temperature.

A similar situation could occur when an aircraft is struck by lightning at the level of a component of the fuselage, made in a composite material.

The present invention relates to a method for manufacturing a composite component comprising superimposed layers of electrically conductive fibers, more specifically carbon fibers, embedded into an electrically insulating matrix, to able to obtain a component adapted to overcome the above mentioned drawbacks.

SUMMARY OF THE INVENTION

To this end, according to this invention, said manufacturing method, wherein:

A/ an assembly is formed, comprising superimposed layers of electrically conductive fibers and separated by a resin intended for making up the matrix;
B/ a vacuum is achieved around this assembly; and
C/ this assembly is submitted in vacuo to a compression and a cooking,
is remarkable in that, at least during the cooking, a superficial pressure is exerted on said assembly generating a deformation that causes local contacts of fibers of at least two superimposed layers, without damaging such fibers.

Thus, thanks to this invention, a composite component is created, preferably made in carbon fiber reinforced plastic of the CFRP type being provided with permanent contacts between the electrically conductive fibers of at least two superimposed layers (of fibers).

Based on these characteristics, upon the application of an electric current on a side of said component, for instance a component of the wall or of the fuselage of an aircraft, such electric contacts allow electric current to flow following the fibers of the thus contacted different layers.

Consequently, a local density of electric current is achieved at the level of the application of the cable on the component, being lower than in the absence of such contacts. Such a flow of the electric current following the electrically conductive fibers reduces heating at the level of the area of application.

The present invention could be applied to a composite material, comprising:
any type of at least slightly (electrically) conductive fibers, although, the higher the conductivity, the more the distribution of the electric current in the composite material is easier and the advantageous effects of the present invention are significant; and
any type of electrically insulating matrix.

More generally, the present invention could apply to a composite material, the resin thereof making up the matrix is electrically more insulating (or less conductive) than the fibers so that there is a lower resistance to the flow of the electric current in the fibers than in the resin.

Said fibers and said matrix could therefore be of any type having the previous characteristics. In particular, the fibers could be arranged in a random or an organized way and they could be manufactured in different ways, for instance through weaving.

In a preferred embodiment:
before the implementation of the above mentioned steps B/ and C/, a pressure plate is applied, provided with an uneven surface on a side of said assembly so as to create said superficial pressure (that generates the deformation causing local contacts of the fibers of the superimposed layers without damaging said fibers), and this pressure plate is maintained in position during said steps B/ and C/ so that these contacts remain in the component at the end of the cooking; and
at a step D/ following the step C/, said pressure plate is removed.

Advantageously, said pressure plate comprises a surface provided with rounded projections being, preferably, arranged in the form of continuous lines, for instance rectilinear lines. Such projections could have any blunt shape, so as to avoid fibers to be damaged and thus, the mechanical properties of said fiber reinforced composite material be deteriorated.

BRIEF DESCRIPTION OF THE DRAWINGS

The FIGS. of the appended drawing will better explain how this invention can be implemented. In these FIGS., like reference numerals relate to like components.

DETAILED DESCRIPTION

The present invention relates to a method for manufacturing a composite component 1 able to be used in a lot of fields (automotive, etc.) and more specifically in the aeronautics. Such a composite component 1 comprises superimposed layers 2 of electrically conductive fibers 3, more specifically carbon fibers, being embedded into an electrically insulating matrix 4. In a preferred embodiment, this composite material is a carbon fiber reinforced plastic of the CFRP (<<Carbon Fiber Reinforced Plastic>>) type.

Such a component 1 could more specifically make up an internal wall or an internal wall part or even a part of the fuselage of an aircraft, for instance of a transport airplane. On FIGS. 1 and 2, a component 1A of this type is shown, achieved according to the prior art.

Figure 1:
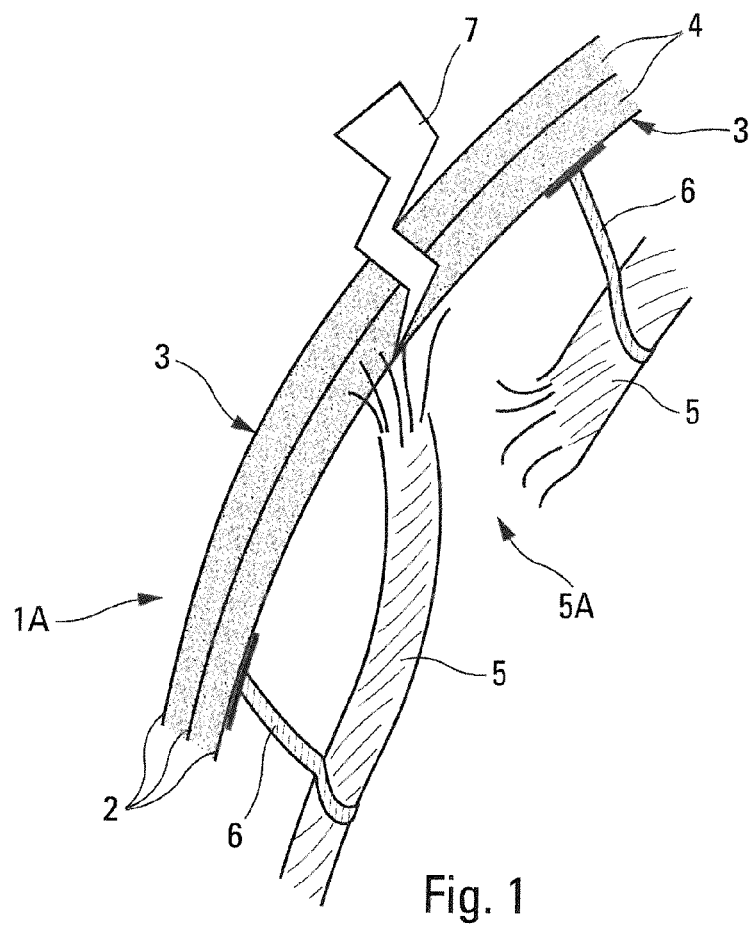
FIGS. 1 and 2 schematically show a short-circuit situation at the level of a usual composite material component, whose the present invention tries to limit the impact.
Figure 2:
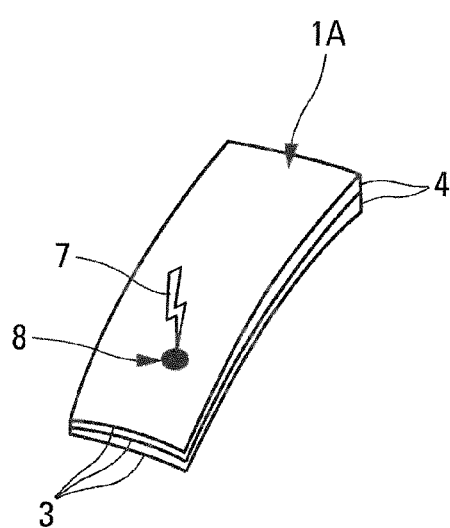

As known, an aircraft is provided with numerous electric cables 5 being, for instance, fastened on these walls, more specifically via usual fastening tabs 6, as shown on FIG. 1, or being arranged in the vicinity of these walls. Thus, should a protective sheath be worn out or upon a breaking 5a of such a cable 5, a short-circuit may occur (illustrated by a symbol 7 on FIGS. 1 and 2) with a direct contact between the electric conductor of the cable 5 and the composite panel or wall located in the vicinity.

Figure 3:
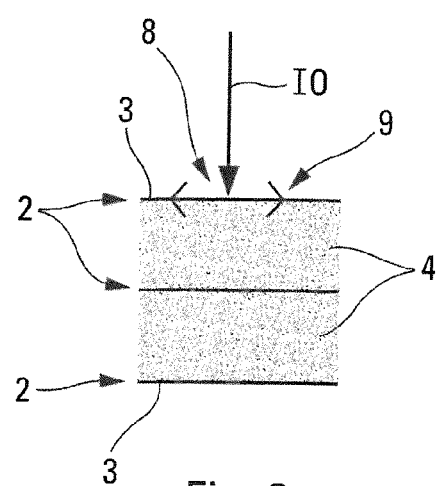
FIG. 3 shows the electric effects of a short-circuit on a usual composite component.

The electric current IO being then injected into the composite material could result in a rise of temperature of the material. One of the worsening parameters related to the occurrence of such phenomena is linked to the distribution of the flow of electric current in the composite material. Indeed, the resin between the layers 2 of fibers 3, making up the composite material matrix 4, electrically insulates such layers 2 one from the other, such as shown on FIG. 3 illustrating, by means of arrows 9, the flow of electric current. Such a flow is only achieved in the fibers 3 of the most superficial layer 2. A high local density of electric current is created at the contact level 8 of the cable with the component 1A, that can cause a fast and significant increase of the temperature. A similar situation may occur when an aircraft is struck by lightning at the level of a component of the fuselage, made in a composite material.

Figure 4A:
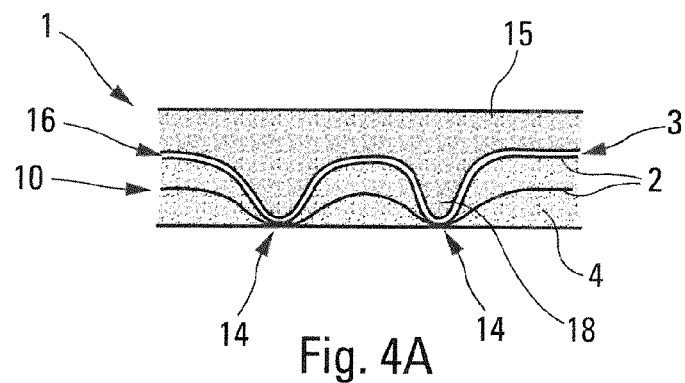
FIGS. 4A, 4B, 4C, and 4D schematically show the successive steps of a manufacturing method according to this invention.
Figure 4B:
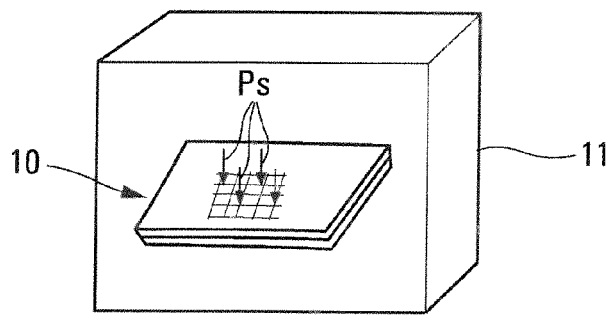
Figure 4C:
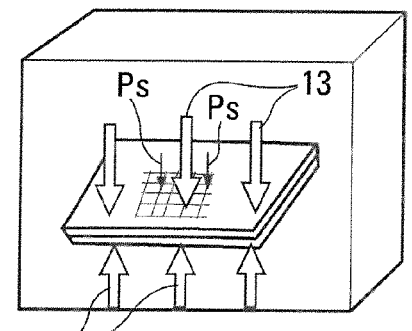

The present invention aims at manufacturing a composite component 1 for solving these drawbacks. To this end, the present invention provides improving a usual manufacturing method, comprising the following successive steps:

a step A/, wherein an assembly 10 is formed, made up of superimposed layers 2 of at least partially conductive fibers 3 being separated by a resin intended to make up the matrix 4, as shown on FIG. 4A;

a step B/, wherein a vacuum 11 is achieved around such an assembly 10, as schematically illustrated on FIG. 4B; and a step C/, wherein such an assembly 10 is submitted in vacuo to a usual compression (arrows 13) and a usual cooking, as schematically illustrated on FIG. 4C.

According to this invention, at least during said cooking, a superficial pressure is locally exerted on said assembly 10 as illustrated by arrows Ps on FIGS. 4B and 4C. Such a superficial pressure generates a (superficial) deformation of the assembly 10 that causes local contacts (in points 14) of fibers 3 of at least two superimposed layers 2, and this without damaging said fibers 3. On the example of FIG. 4A, the exerted superficial pressure generates local contacts of fibers 3 of three superimposed layers 2. This FIG. 4A is a very schematic FIG. on which the effect of the exerted pressure is amplified, so as to better emphasize the above mentioned characteristics.

Figure 4D:
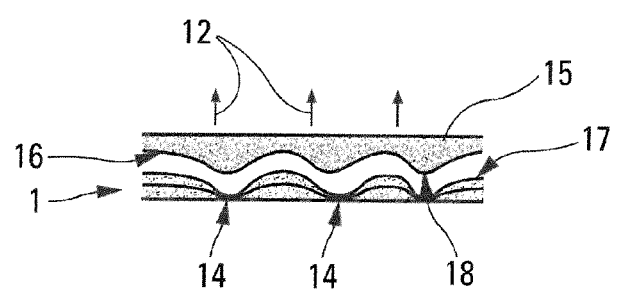

In a preferred embodiment:

at step A/, after the assembly 10 is formed, a pressure plate 15 is applied, provided with an uneven surface 16 on a side 17 of said assembly 10 so as to create said superficial pressure and this pressure plate 15 is maintained in position during steps B/ and C/ as shown on FIGS. 4B and 4C; and at a step D/ following step C/, that is after the cooking, said pressure plate 15 is removed as illustrated with arrows 12 on FIG. 4D so as to obtain said composite component 1.

Said pressure plate 15 comprises a surface 16 provided with rounded projections 18 being, preferably, arranged in the form of continuous lines, for instance rectilinear lines. Such projections 18 are blunt and they prevent the fibers 3 from being damaged, and thereby, the mechanical properties of the fiber reinforced composite material 3 from being deteriorated. Consequently, the present invention has no substantial negative effect on the mechanical properties of the achieved component 1, with respect to those of a usual component 1A.

Furthermore, the pressure plate 15 is made in an appropriate material able to withstand aggressions, more specifically the compression and the cooking, exerted during the implementation of the method, and it can have superficial qualities (for instance an appropriate coating) for performing an easy removal at step 4D.

Thus, by means of the manufacturing method according to this invention, a component 1 is achieved, made in a composite material, preferably a carbon fiber reinforced plastic of the CFRP type, being provided with permanent contacts 14 between the electrically conductive fibers 2 of at least two superimposed layers 3 (of fibers).

Figure 5:
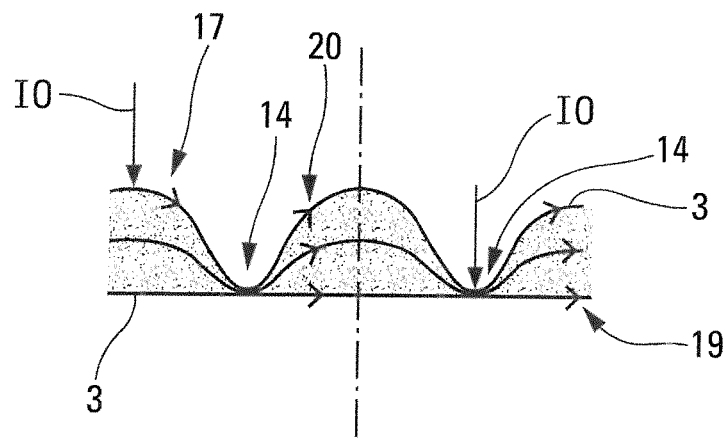
FIG. 5 shows a diagram similar to that on FIG. 3, for better emphasizing the advantages of the present invention.

Thanks to such characteristics, upon the application of an electric current IO on a side 17 of said component 1, for instance a component of the wall or of the fuselage of an aircraft, such electric contacts 14 allow the electric current to flow (and thereby, to be distributed) following the fibers 3 of the thus contacted different layers, as illustrated with the arrows 19 and 20 on FIG. 5.

On the example of the right part of this FIG. 5, the current IO is applied directly at the level of the contact 14, so as to have a direct distribution of the current between the layers, as shown with the arrows 19, while, on the example of the left part of this FIG. 5, the current IO is applied in the vicinity of the contact 14 so that the distribution of the current between the layers occurs when it reaches said contact 14 as shown by the arrows 20.

Figure 6:
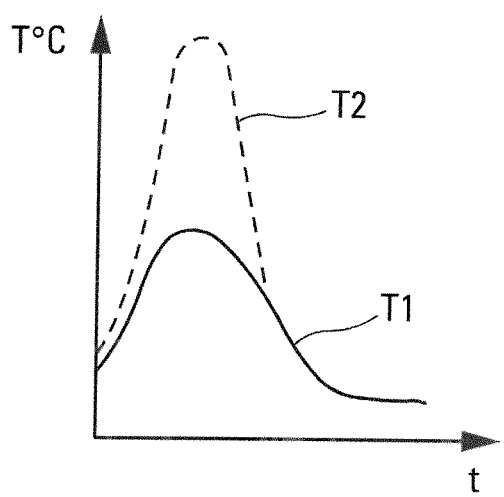
FIG. 6 is a diagram illustrating the heating difference generated on a usual component and a component according to this invention.

Consequently, a local density of the electric current is obtained at the level or in the vicinity of the application of the current IO on the component 1, being lower than in the absence of such contacts 14, as illustrated on FIG. 6. On this FIG. 6, a variation of the temperature T (for instance in ° C.) is schematically shown at the level of the area 8 as a function of the time t, during a short-circuit, in the form of a curve T1 in solid line relating to the component 1 according to this invention, being compared to a curve T2 in broken line relating to a usual component 1A. The flow of the electric current IO following the electrically conductive fibers 3 thus reduces heating at the level of the area of application.

The present invention applies to a composite component 1, comprising:

any type of at least slightly (electrically) conductive fibers 3. Obviously, the higher the conductivity, the easier the distribution of the electric current in the composite material becomes and the positive effects of the present invention are significant; and any type of electrically insulating matrix 4.

More generally, the present invention could apply to a composite material, the resin thereof making up the matrix 4 is electrically more insulating (or less conductive) than the fibers 3 so that there is a lower resistance to the flow of the electric current in the fibers 3 than in the resin.

Said fibers 3 and said matrix 4 could therefore be of any type having the previous characteristics. In particular, said fibers could be arranged in a random or an organized way and they could be manufactured in different usual ways, for instance through weaving.

The invention claimed is:

1. A method for manufacturing a composite component comprising superimposed layers of electrically conductive fibers embedded into an electrically insulating matrix the method comprising:

(A) forming an assembly comprising superimposed layers of electrically conductive fibers and separated by a resin intended for making up the matrix;
   (B) achieving a vacuum around the assembly;
   (C) submitting the assembly in vacuum to a compression and a cooking, wherein at least during the cooking, a superficial pressure is exerted on the assembly generating a deformation that causes local contacts of fibers of at least two superimposed layers, without damaging the fibers; and
   (D) removing the pressure plate following step (C),
   wherein before steps (B) and (C), the method includes applying a pressure plate, the pressure plate provided with an uneven surface on a side of the assembly so as to create the superficial pressure, and
   wherein during the steps (B) and (C), the method includes maintaining the pressure plate in position.

2. The method according to claim 1, wherein the pressure plate comprises a surface provided with round projections.

3. The method according to claim 2, wherein the projections are arranged in the form of continuous lines on the surface of the pressure plate.

4. The method according to claim 1, wherein the composite material defines a carbon fiber reinforced plastic.

5. The method according to claim 1, wherein the pressure plate comprises a surface provided with blunt projections to avoid damaging the fibers when the superficial pressure is exerted during step (C).

* * * * *